Aug. 19, 1947.  H. K. HECKER  2,426,095
WORK HOLDING MECHANISM
Filed Jan. 8, 1944  2 Sheets-Sheet 1
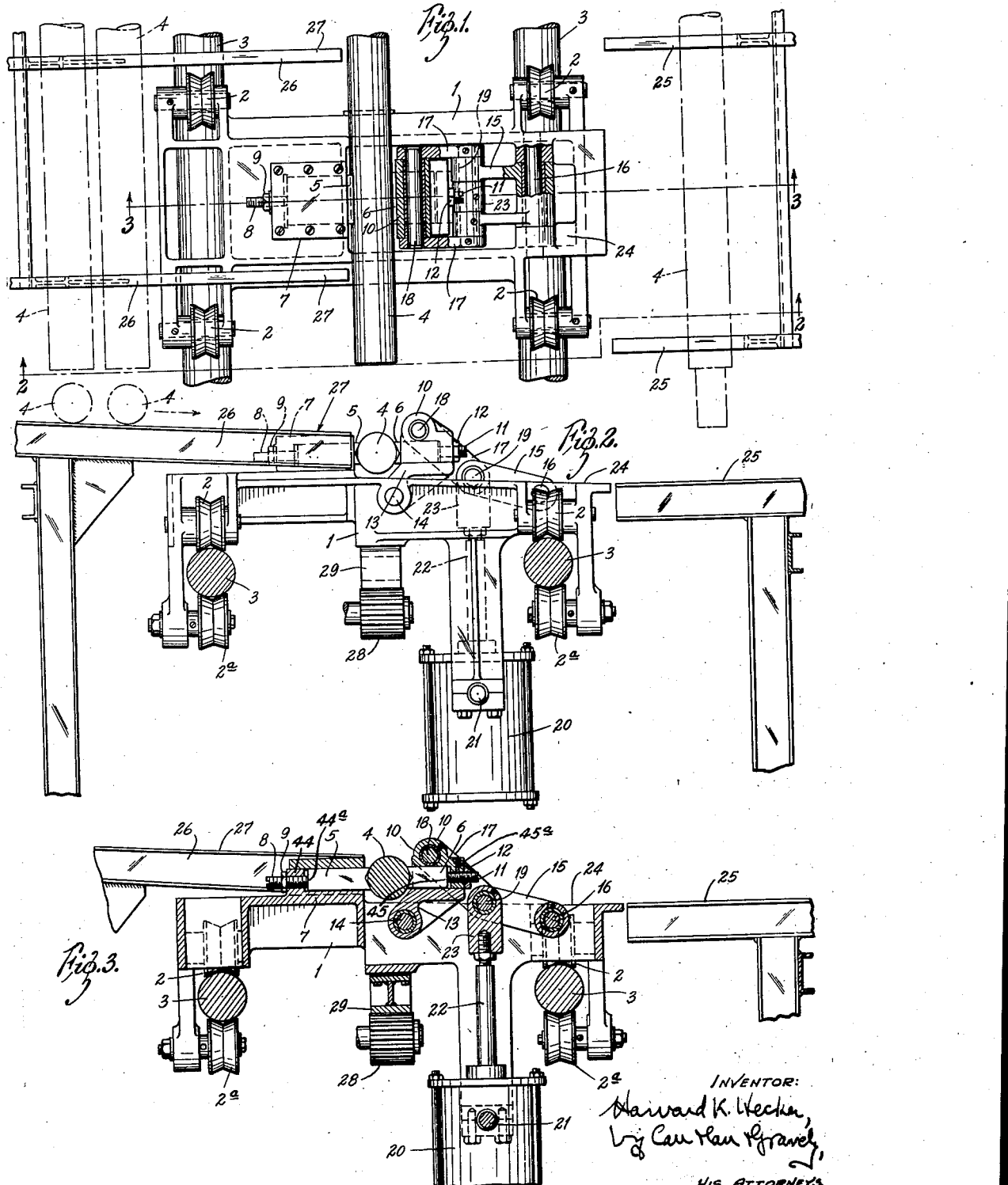

Aug. 19, 1947. H. K. HECKER 2,426,095
WORK HOLDING MECHANISM
Filed Jan. 8, 1944 2 Sheets-Sheet 2
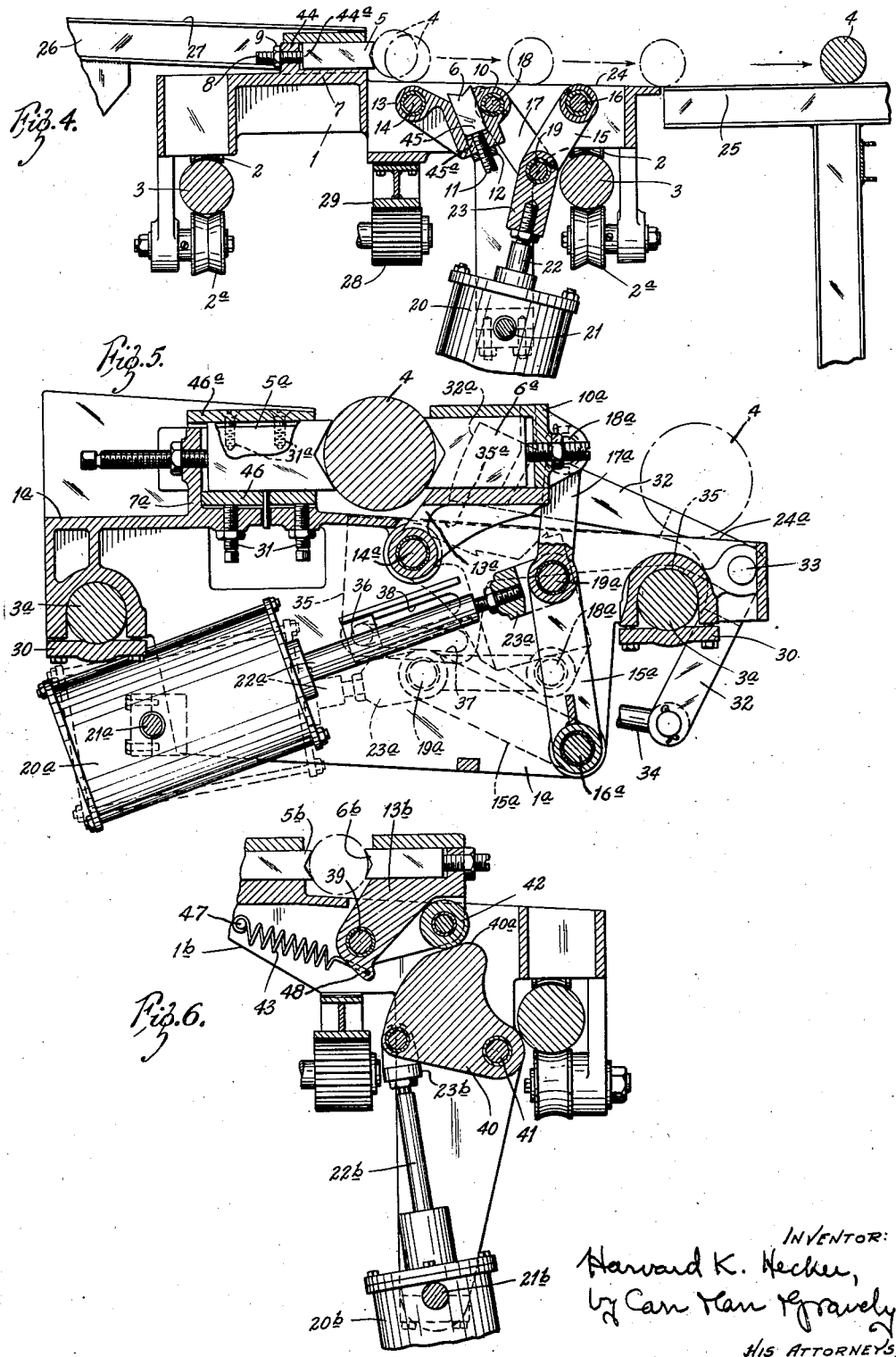
INVENTOR:
Harvard K. Hecker,
by Carr Van Gravely,
HIS ATTORNEYS.

Patented Aug. 19, 1947

2,426,095

UNITED STATES PATENT OFFICE 2,426,095

WORK HOLDING MECHANISM

Harvard K. Hecker, Clayton, Mo.

Application January 8, 1944, Serial No. 517,605

16 Claims. (Cl. 24—249)

This invention relates to work holding mechanisms, particularly mechanisms for non-revolubly holding bar stock in position to be operated upon by various tools. The invention has for its principal objects to devise a powerful and easily operable, quick engageable and disengageable bar stock gripping or clamping mechanism; to provide for quickly and easily positioning the bar stock for engagement by the gripping mechanism; to provide a final accurate positioning of the bar stock in the gripping mechanism; to provide a bar roll-off surface upon which the bar stock is deposited when released by the gripping mechanism; to provide for movement of one of the jaws of the gripping mechanism below the bar roll-off surface when said mechanism is opened; to provide fluid actuated means for operating the movable gripping jaw; to provide for adjusting the gripping mechanism for various sizes and shapes of bar stock; to provide for varying the clamping pressure of the gripping mechanism; to provide a releasable stop for holding the bar stock on the roll-off surface; and to provide for varying the height and angle of the roll-off surface. The invention consists in the work holding mechanism and in the parts and combinations and arrangements of parts hereinafter described and claimed.

In the accompanying drawings, which form part of this specification and wherein like symbols refer to like parts wherever they occur, Fig. 1 is a top plan view of a work holding mechanism embodying my invention, the pivotal connections between the toggle joint and the carriage and between the toggle joint and the movable jaw element of said mechanism being shown in horizontal section, Fig. 2 is a vertical cross-sectional view on the line 2—2 in Fig. 1, Fig. 3 is a similar view on the line 3—3 in Fig. 1, Fig. 4 is a view similar to Fig. 3, showing the work gripping mechanism in released position; and Figs. 5 and 6 are views similar to Fig. 3 illustrating two modified forms of the invention on an enlarged scale and with certain parts omitted.

The work holding mechanism shown in Figs. 1 to 4, inclusive, of the accompanying drawings, comprises a grip carriage or body 1 supported on rollers 2 for movement along spaced parallel horizontally disposed rails or runner bars 3, of circular cross-section, two of such supporting rollers operating on each rail and being grooved to fit the curved upper surface thereof. The carriage is also provided with a plurality of similar grooved hold-down rollers 2a, each disposed beneath a supporting roll 2 and cooperating with the curved lower surface of a rail 3. The carriage 1 is provided with mechanism for gripping or clamping thereto bar stock 4 of circular or other cross-section. Said mechanism comprises two relatively movable clamp blocks or jaws 5 and 6 that have their opposing ends grooved to grip opposite sides of said bar stock. The clamp block 5, which constitutes the stationary jaw element of the gripping mechanism, is removably mounted in a housing 7 rigid with the top of the carriage 1 with the grooved bar stock engaging end of said block projecting horizontally from one end of said housing. The stationary clamp block 5 is adjusted in the housing 7 for bar stock of different diameters preferably by means of a screw 8 which is threaded through the closed end 44 of said housing in abutting relation to the inner or rear end 44a of said block, said screw being locked in the desired position of adjustment by means of a lock nut 9.

The other clamp block or jaw element 6 of the above bar stock gripping mechanism is mounted in a housing 10 for movement therewith towards and away from the stationary clamp block or jaw element 5 of said mechanism. The grooved bar stock engaging end of the clamp block 6 projects from the front end of the movable housing 10; and the rear end 45 of said block seats against an adjusting screw 11 that is threaded through the rear end 45a of said housing and is locked thereto by means of a lock nut 12. The supporting housing 10 for the clamp block 6 is preferably formed integral with the free end portion of a rock arm or lever 13 that is pivotally supported on a horizontal shaft 14 for vertical swinging movement towards and away from the stationary clamp block 5, said shaft being suitably supported in the end walls of the carriage 1.

The supporting arm 13 for the clamp block 6 is actuated by means of a toggle joint comprising links 15 that are connected by a horizontal pivot 16 to the carriage 1 and links 17 that are connected by a horizontal pivot 18 to the clamp block housing 10 formed on the free end of said arm. The other ends of the links 15 and 17 are connected together by a horizontal pivot 19, and the toggle joint is straightened to swing the clamp block 6 upwardly into operative position and broken to swing said block downwardly into inoperative position by means of a fluid operated cylinder 20, which is pivotally supported, as at 21, in the carriage 1 for vertical swinging movement relative thereto and has a piston rod 22 whose outer end is threaded into a clevis 23 that is pivotally connected to the pivot 19 at the knee of said toggle joint. Air or other fluid pressure is supplied to the end of the cylinder 21 remote from the piston rod 22 for straightening the toggle joint and to the end of said cylinder adjacent to said piston rod for breaking said joint. By this arrangement, the movable clamp block 6 is swung upwardly into line with the stationary clamp block 5 so as to clamp the bar stock 4 between the opposing ends of said blocks when the toggle is straightened; and said movable clamp block is swung away from said stationary clamp block to release said bar stock when said toggle is broken. By adjusting the clamp block or jaw 6 in its supporting lever 13, the pivots 16, 18 and 19 of the toggle joint may be moved closer to said straight line, thereby increasing the clamping pressure of said jaw.

As shown in the drawings, the carriage 1 is provided along its top with a bar stock roll-off surface 24 which inclines downwardly from a level just below the work engaging end of the stationary clamp block 5 and across the path of movement of the movable clamp block 6 to one side of the carriage; and the movable clamp block supporting housing swings upwardly above this roll-off surface to engage the bar stock 4 and below said surface when the bar stock is released. Thus, when the movable jaw 6 moves away from the stationary jaw 5, the bar stock is released and drops upon the inclined roll-off surface 24, after which said movable jaw swings downwardly beneath said inclined roll-off surface, thereby permitting said bar stock to roll down such surface to one side of the carriage 1 and onto a suitable discharge storage table 25 located adjacent thereto. Located on the other side of the carriage 1 is a bar stock loading table 26 having an upper work supporting surface 27 that inclines downwardly towards and terminates in line with the working end of the stationary clamp block 5. Thus, the bar stock 4, when positioned on the inclined roll-on surface 27 of the carriage loading table 26, will roll downwardly thereon and drop off the end thereof in front of the working end of the stationary block 5 and onto the inclined roll-off surface 24 of the carriage 1. When the bar stock is thus deposited on the inclined roll-off surface 24 opposite the working end of the stationary clamp block 5, the movable clamp block 6 swings upwardly through said surface into engagement with the bar stock 4 which is lifted off the roll-off surface and accurately centered between the working ends of the two clamp blocks by the V-shaped bar engaging ends thereof. The above arrangement provides a gravity work feed and discharge for the carriage 1. However, if desired, the work piece may be loaded on the carriage by sliding the bar stock 4 axially in front of the stationary jaw 5, by lowering or dropping said stock in front of said jaw or by sliding or rolling said stock upwardly along the roll-off surface 24.

The hereinbefore described work holding mechanism operates as follows. The bar stock 4 rolls down the inclined loading table 26 on one side of the carriage 1 and drops off the end thereof and is deposited upon the inclined roll-off surface 24 of said carriage where it is manually held by the operator just in front of the V-shaped working end of the stationary jaw 5 of the bar gripping mechanism. The fluid cylinder 20 is then actuated to straighten the toggle links 15 and 17 which swing the movable jaw member 6 of the gripping mechanism upwardly above the inclined roll-off surface 24 and into engagement with the side of the bar stock 4 that has just been deposited on said surface. Further straightening of the toggle causes the bar stock 4 to be rigidly clamped between the two jaws 5 and 6, the V-shaped ends of said jaws causing the bar stock to be lifted clear of the roll-off surface 24 and to be accurately centered vertically relative thereto. The carriage 1 is then moved along its supporting rails, to axially advance and/or retract the bar stock, preferably by means of a power-driven pinion 28 that intermeshes with a longitudinal rack 29 rigid with said carriage, after which the fluid cylinder 21 is operated to break the toggle and swing the movable jaw 6 of the gripping mechanism below the roll-off surface 24 of the carriage, whereupon the bar stock is deposited upon said roll-off surface and rolls off the same onto the discharge storage table 25. As stated above, the fluid cylinder 20 for actuating the toggle mechanism is supported entirely on the carriage 1 so as to constitute a self-contained unit therewith. Both jaws of the gripping mechanism may be adjusted for bar stock of different diameters; and the clamping pressure of the gripping mechanism may be increased by adjusting the movable jaw 6 in the rock arm 13 to bring pivots 16, 18 and 19 closer to a straight line when the toggle links are straightened to bring the gripping mechanism into clamping engagement with the bar stock.

The work gripping mechanism shown in Fig. 5 is similar to the work gripping mechanism hereinbefore described except that the support 1a, which corresponds to the carriage 1, is rigidly clamped, as at 30, to the two supporting rails 3a, and the stationary jaw 5a of the gripping mechanism is mounted in the housing 7a between a supporting plate 46 in the bottom thereof and a cover plate 46a for the top thereof. As shown in Fig. 5, the stationary jaw 5a is adjusted vertically in the housing 7a by means of screws 31 that are threaded inwardly through the bottom of said housing in abutting relation to the underside of the plate 46 therein; and the cover plate 46a of said jaw is clamped down on the top of said jaw by means of screws 31a that extend downwardly through said cover plate and are threaded into the side walls of said housing. The construction shown in Fig. 5 also includes a slightly different toggle operating mechanism for the movable jaw 6a. This mechanism comprises a link 17a pivoted, as at 18a, to the jaw supporting housing 10a of the rock arm 13a that is pivotally supported on a horizontal pivot 14a on the support 1a, a link 15a pivotally anchored as at 16a, to the support 1a, a pivot 19a for pivotally connecting adjacent ends of said links, and a fluid cylinder 20a pivotally supported, as at 21a, on said body and having a piston rod 22a connected at its outer end by means of a shackle 23a to the point of junction between said links. The operation of the toggle operated jaw of the gripping mechanism shown in Fig. 5 is substantially that shown in Figs. 1 to 4.

In the construction shown in Fig. 5, each end of the stationary body 1a has a stop lever 32 pivoted thereto, as at 33, at the lower end of its inclined roll-off surface 24a for vertical swinging movement above and below said roll-off surface, only one stop lever being shown. The stop lever 32 has the shape of a bell crank with one arm extending below the body 1a and with the other arm extending toward the upper end of the roll-off surface 24a thereof. The stop lever 32 is actuated by a push-and-pull rod 34 that is pivotally connected to the depending arm thereof; and, in the raised position of said lever, the free end 32a of the upper arm thereof is disposed in the path of the bar stock 4 and prevents the same from rolling down the roll-off surface 24a and off the lower end thereof. When the stop lever 32 operated to swing the upper arm thereof downwardly below the roll-off surface 24a, the bar stock is permitted to roll downwardly along the same onto a discharge table (not shown) similar to the discharge table 25 shown in Figs. 1 to 4, inclusive.

The construction shown in Fig. 5 is also provided at each end with a vertically disposed bar roll-off plate 35, which is supported by the pivots 33 for vertical swinging movement relative to the body 1a and has a straight top edge 35a adapted to serve as a roll-off surface. For bar stock 4 of large diameter, the roll-off plate 35 is locked to the body with its upper edge 35a below or flush with the roll-off surface 24a of the body 1a. For bar stock of relatively small diameter, the roll-off plate 35 is swung upwardly above the roll-off surface 24a of the body 1a so that its upper edge 35a constitutes a raised roll-off surface for the smaller diameter bars. The roll-off plate 35 is locked in the desired position of its swinging movement by means of a bolt 36 which extends through angularly disposed elongated slots 37 and 38 formed in said plate and the body 1a, respectively. Thus, the plate 35 may be raised and lowered by sliding the bolt relative to the intersecting slots 37 and 38, thereby causing said plate to move relative to the body 1a.

In the modification shown in Fig. 6, the pivotal jaw supporting member 13b of the bar stock gripping mechanism is pivotally supported, as at 39, in the carriage 1b and is swung upwardly to bring the jaw 6b into line with the stationary jaw 5b to grip the bar stock between said jaws by means of an edge cam 40 that is mounted on a horizontal shaft 41 carried by said carriage and has a cam surface 40a that cooperates with the underside of a horizontal cam roller 42 journaled on the pivotal jaw support. The cam 40 is swung upwardly to close the movable jaw 6b by means of a fluid operated cylinder 20b that is pivotally supported, as at 21b, in the carriage 1b and has a piston rod 22b that is pivotally connected by a clevis 23b, to said cam. A coil tension spring 43 has one end anchored to a pin 47 fixed to the carriage 1b beneath the stationary jaw 5b and has its other end secured to a lug 48 on the pivoted end of the jaw supporting member 13b, whereby said spring operates to hold the cam roller 42 on the pivotal jaw supporting member against the cam surface 40a of the edge cam 40 and to swing said member downwardly into jaw opening position when said cam is moved into inoperative position by the fluid operated cylinder 20b. Obviously, the hereinbefore described work gripping mechanism admits of considerable modification without departing from the invention. Therefore, I do not wish to be limited to the precise arrangements shown and described.

What I claim is:

1. A work holding mechanism comprising a body having a work supporting surface, a stationary jaw located above said surface in position to laterally engage one side of work thereon, and a jaw mounted in said body for movement upwardly above said surface into lateral engagement with the opposite side of said work to immovably clamp the latter horizontally between said jaws and downwardly beneath said surface to release said work.

2. A work holding mechanism comprising a body having a supporting surface, a stationary jaw mounted on said body above said surface in position to laterally engage one side of a work piece thereon, and a jaw mounted on said body for vertical swinging movement upwardly above said surface to substantially the level of said stationary jaw into lateral engagement with the opposite side of said work piece to immovably clamp the latter horizontally between said jaws and downwardly beneath said surface to release said work piece.

3. A holding mechanism for a work piece, said mechanism comprising a body having an inclined supporting surface, a stationary jaw located above said inclined surface and positioned to laterally engage one side of work piece deposited thereon and a jaw pivotally mounted in said body for movement upwardly above said inclined surface and towards said stationary jaw into lateral engagement with the opposite side of said work piece to lift the latter off said inclined surface and immovably clamp it horizontally between said jaws and for movement away from said stationary jaw to release said work piece and downwardly below said inclined surface to permit the released work piece to move downwardly thereon.

4. A work holding mechanism comprising a body having a work supporting surface, a stationary jaw located above said surface in position to laterally engage one side of work thereon, a jaw mounted in said body for vertical swinging movement upwardly above said surface into lateral engagement with the opposite side of said work to immovably clamp the latter horizontally between said jaws and downwardly beneath said surface to release said work, and means for actuating said movable jaw, said means being adjustable to vary the clamping pressure of said movable jaw.

5. A holding mechanism for bar stock of substantially circular section, said mechanism comprising a body having an inclined bar stock roll-off surface, a stationary jaw located above said roll-off surface, a member having an inclined bar stock roll-on surface adapted to deposit the bar stock on said roll-off surface in position to be laterally engaged on one side by said stationary jaw, and a jaw mounted on said body for movement upwardly above said roll-off surface and towards said stationary jaw into lateral engagement with the opposite side of said bar stock to immovably clamp the latter horizontally between said jaws and laterally away from said stationary jaw to release said bar stock and downwardly entirely beneath said roll-off surface.

6. A work holding mechanism comprising a body having a work supporting surface, a stationary jaw located above said surface in position to laterally engage one side of work thereon, a second jaw, and a supporting lever for said second jaw pivotally mounted in said body for moving said second jaw upwardly above said surface and laterally towards said stationary jaw into engagement with the opposite side of said work to immovably clamp the latter horizontally between said jaws and laterally away from said stationary jaw to release said work and downwardly below said surface.

7. A work holding mechanism comprising a body having two vertically offset work supporting surfaces inclined in the same direction, a fixed jaw located in the offset between said surfaces, and a jaw pivotally mounted on said body for vertical swinging movement upwardly above the lower surface into lateral engagement with work dropped thereon from the upper surface to clamp said work horizontally between said jaws, and laterally away from said stationary jaw to release said work and downwardly beneath said lower surface.

8. A work holding mechanism comprising a body having an inclined roll-off surface, a fixed jaw located above said roll-off surface and adapted to engage one side of work deposited thereon, a jaw mounted in said body for vertical swinging movement upwardly above said roll-off surface into engagement with the opposite side of said work to clamp the latter between said jaws and downwardly below said surface to release said work, and a stop movable above said inclined roll-off surface to retain said work thereon.

9. The combination set forth in claim 8, wherein said roll-off surface comprises a member mounted on said body for vertical adjustment relative thereto and means is provided for locking said member in any position of its vertical movement.

10. A work holding mechanism comprising a body having an inclined roll-off surface, a fixed jaw located above said roll-off surface and adapted to engage one side of work deposited thereon, a jaw mounted in said body for vertical swinging movement upwardly above said roll-off surface into engagement with the opposite side of said work to clamp the latter between said jaws and downwardly below said surface to release said work, a member mounted on said body for vertical movement relative thereto and constituting said roll-off surface, and means for locking said member in any position of its vertical movement.

11. A work holding mechanism comprising a body having a work supporting surface, a stationary jaw located above said surface and adapted to laterally engage one side of work deposited thereon, a jaw mounted in said body for vertical swinging movement upwardly above said work supporting surface and towards said stationary jaw into engagement with the opposite side of said work to immovably clamp the latter horizontally between said jaws and downwardly below said surface to release said work, and a toggle mechanism mounted on said support and cooperating with said movable jaw to actuate the same.

12. The combination set forth in claim 11 wherein means is provided for adjusting said toggle mechanism to vary the pressure of said movable jaw on said work.

13. A work holding mechanism comprising a body having a work supporting surface, a stationary jaw located above said surface and adapted to laterally engage one side of work deposited thereon, a jaw mounted in said body for vertical swinging movement upwardly above said work supporting surface into engagement with the opposite side of said work to immovably clamp the latter horizontally between said jaws and downwardly below said surface to release said work, and a toggle mechanism mounted on said support and cooperating with said movable jaw to actuate the same, said toggle mechanism comprising a pair of links pivotally secured together, the remote ends of said links being pivotally connected one to said support and the other to said movable jaw, and means mounted entirely on said support cooperating with said links at their point of junction for straightening and breaking said toggle mechanism.

14. A work holding mechanism comprising a body having a work supporting surface, a stationary jaw located above said surface and adapted to laterally engage one side of work deposited thereon, a jaw mounted in said body for vertical swinging movement upwardly above said work supporting surface into engagement with the opposite side of said work to immovably clamp the latter horizontally between said jaws and downwardly below said surface to release said work, a toggle mechanism mounted on said support and cooperating with said movable jaw to actuate the same, said toggle mechanism comprising a pair of links pivotally secured together, the remote ends of said links being pivotally connected one to said support and the other to said movable jaw, a fluid pressure cylinder pivotally mounted on said body and cooperating with said links at their point of junction for straightening and breaking said toggle mechanism, and means for adjusting said toggle mechanism to vary the pressure of said movable jaw on said work.

15. A work holding mechanism comprising a body with a stationary jaw, a jaw pivotally supported on said body for movement relative thereto to clamp work horizontally between said jaws, and means mounted on said support for moving said pivotal jaw into work clamping position, said means comprising a cam rotatably supported on said body, a cam roller carried by said pivotal jaw and engageable by said cam, and means carried by said body for actuating said cam.

16. A work holding mechanism comprising a body having a supporting surface, a stationary jaw mounted on said body above said surface in position to engage one side of a work piece thereon, and a jaw mounted on said body for vertical swinging movement upwardly above said surface to substantially the level of said stationary jaw into engagement with the opposite side of said work piece to clamp the latter horizontally between said jaws and downwardly beneath said surface to release said work piece, and means mounted on said body for moving said jaw into work clamping position, said means comprising a cam mounted on said body, a roller movable with said movable jaw and engageable by said cam, fluid pressure operated means for actuating said cam, and means for holding said roller in engagement with said cam.

HARVARD K. HECKER.

REFERENCES CITED

The following references are of record in the file of this patent:

UNITED STATES PATENTS

| Number | Name | Date |
| --- | --- | --- |
| 1,048,705 | Kleffman | Dec. 31, 1912 |
| 1,569,327 | Linthwaite | Jan. 12, 1926 |
| 1,716,840 | Stevenson | June 11, 1929 |
| 1,922,980 | Reis | Aug. 15, 1933 |
| 1,809,068 | Roth | June 9, 1931 |